June 17, 1941.   H. C. KRONE ET AL   2,246,136
SELF-CLOSING VALVE
Filed July 20, 1940

INVENTORS
HOWARD C. KRONE AND WILLIAM MEYER,
BY George D. Richards
ATTORNEY.

Patented June 17, 1941

2,246,136

UNITED STATES PATENT OFFICE 2,246,136

SELF-CLOSING VALVE

Howard C. Krone, Weehawken, and William Meyer, East Orange, N. J., assignors to A. W. Wheaton Brass Works, Newark, N. J., a corporation of New Jersey Application July 20, 1940, Serial No. 346,562

4 Claims. (Cl. 251—138)

This invention relates to improvements in self-closing valves of the slow-closing type; and the invention has reference, more particularly, to a valve of such type having a novel means for controlling the closing motion thereof whereby the initial stages of the closing movement are relatively rapid but, as the closing motion continues, said movement is progressively checked so that valve will approach and finally settle upon its seat in closed condition without causing undue back pressure or liquid hammer in the pipe-line, serving the valve, at any phase of the valve closing movement.

This invention has for an object to provide a self-closing valve provided with novel and simple means for controlling the closing motion thereof with progressive reduction of movement speed as the valve moves toward its seat, whereby the initial phase of the closing motion may be comparatively rapid but steadily reduced in speed as the valve nears and finally engages its seat.

Other objects of this invention, not at this time more particularly enumerated, will be understood from the following detailed description of the same.

Figure 1:
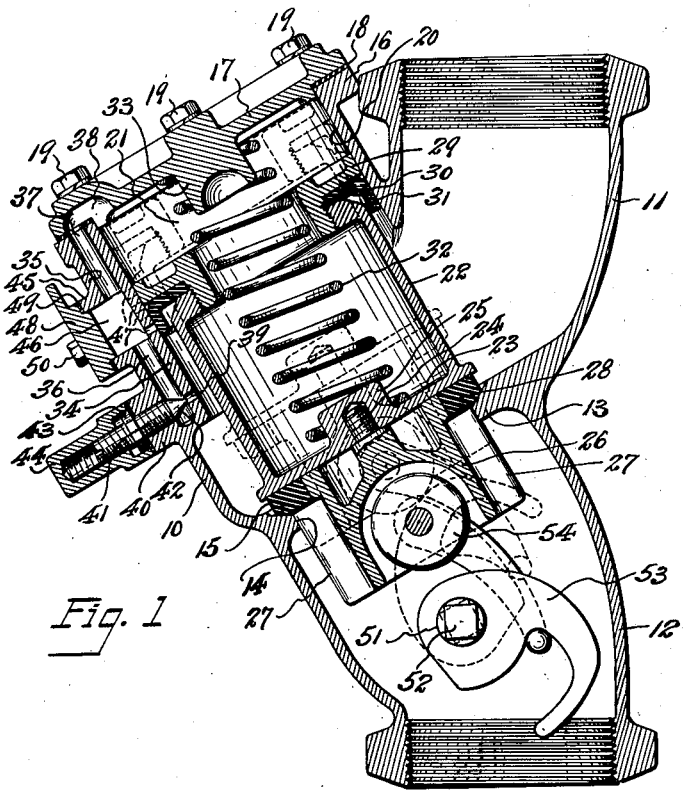
Figure 2:
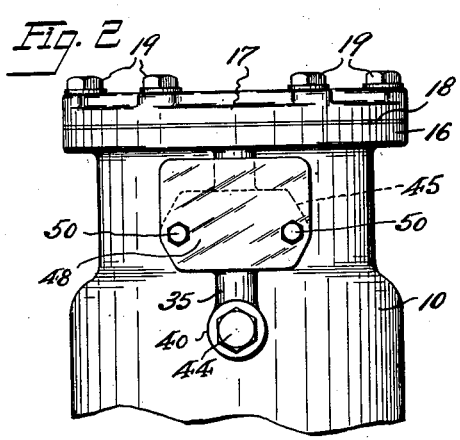
Figure 3:
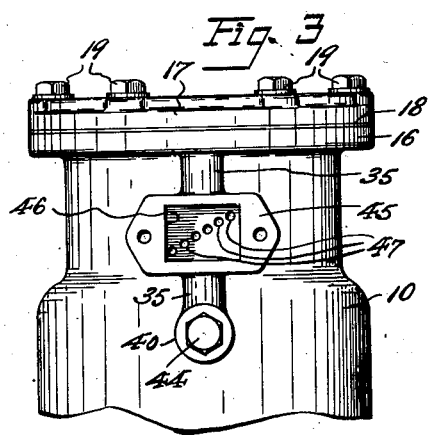

An illustrative embodiment of the invention is shown in the accompanying drawing, in which:

Fig. 1 is a vertical longitudinal sectional view of a valve constructed in accordance with the principles and embodying features of this invention; Fig. 2 is a fragmentary elevational view of the upper portion of the valve; and Fig. 3 is a view similar to that of Fig. 2, but with parts removed to show interior construction.

Similar characters of reference are employed in the above described views, to indicate corresponding parts.

Referring to the drawing, the reference character 10 indicates the main body of the valve casing which is of cylindrical form. Springing from a side of said main body is an intake extension 11, and extending from the lower end of said main body is an outlet extension 12. Said main body 10 is provided at its lower end with a transverse partition portion 13 disposed intermediate the intake extension 11 and outlet extension 12. Said partition is provided with a valve port opening 14 which is aligned with the longitudinal axis of said main body 10. Formed on the upper margin of said valve port opening 14 is a chamfered valve seat 15.

At its upper end, said main body 10 is provided with an annular flange 16 upon which is seated a closure head 17 and intermediate sealing gasket 18, said head 17 being secured in place by cap screws 19, or in any other suitable manner.

Formed in the upper end of said main body 10 is a cylindrical bore 20 defining a cylinder chamber 21. Mounted for reciprocation in said main body is a hollow upwardly open plunger 22 having a bottom end wall 23. Affixed to said bottom end wall 23 by an axial stud 24, which screws into an internally threaded socket boss 25 with which said bottom end wall 23 is provided, is an axial extension 26 of reduced diameter, the same having radial guide ribs 27 which slidingly engage the margins of the valve port opening 14, so as to assist in controlling the operative axial movements of said plunger 22. Surrounding said extension 26, and based against the marginal portions of the underside of said bottom end wall 23 of the plunger 22 is a valve disc or washer 28. Said valve disc or washer 28 is made of a suitable material, and is adapted to contactingly cooperate with the valve seat 15 to close the valve port or opening 14. Threaded into the upper end of the plunger 22, or otherwise suitably affixed thereto, is a piston member 29 adapted to slidingly engage the bore 20 of the cylinder chamber 21. Affixed to the underside of said piston member 29 is a piston washer 30 of comparatively flexible material, having a dependent peripheral skirt 31 to slidingly hug the bore 20 of said cylinder chamber 21. Said piston washer 30 serves as a sealing ring between the piston member 29 and the bore 20 of said cylinder chamber 21, and is illustrative of one form of means to serve such function; it will be understood, however, that any other known arrangement serving such purpose may be optionally employed.

Extending axially into the hollow plunger 22, between the head 17 and the bottom end wall 23 of said plunger, is a valve closing spring 32, the upper end of which is retained in operative position by engagement around a seating boss 33 which depends from the inner or underside of said head 17, while its lower end is retained in operative position by engagement around the boss 25 with which the plunger bottom end wall 23 is provided.

Formed in connection with the body 10 of the valve casing, exteriorly of the adjacent wall 34 of the cylinder chamber 21 is a longitudinal by-pass member 35 having a passage 36 rising therethrough and terminating at its top in an open end 37 to communicate in any suitable manner with the upper interior end of the cylinder chamber 21, above the piston member 29 with which plunger 22 is provided. Illustrative of one way of establishing such communication, the head 17 is formed with a suitably located branch passage 38, one end of which communicates with the open end 37 of the by-pass passage 36 and the other end of which communicates with the upper interior of the cylinder chamber 21. Formed in the cylinder chamber wall 34 is a port 39 intercommunicating with the lower part of said by-pass passage 36 and the interior of the cylinder chamber 21 below the piston member 29. Means is provided for adjustably restricting the flow of fluid through said port 39, the same comprising an internally screw-threaded boss 40 externally projecting from the outer side of said by-pass member 35 in opposed axially aligned relation to said port 39. Threaded through said boss 40 is the screw-threaded shank 41 of a needle valve 42 adapted to cooperate with said port 39. Said shank 41 carries a lock-nut 43 which, when the needle-valve 42 is desirably adjusted, may be turned home against the end of the boss 40, to thereby lock the needle-valve 42 against displacement from such adjusted position. If desired, a protective cap 44 may be screwed onto the external end of the needle-valve shank 41, as shown.

Formed in connection with said by-pass member 35 is an outwardly open and laterally enlarged chambered portion 45, the chamber 46 of which intersects the by-pass passage 36 at a proper point intermediate its ends. Said chamber 46 terminates at the cylinder chamber wall 34, and provided in said wall is an oblique line of check-ports 47 which communicate between the by-pass passage 36 and the interior of the cylinder chamber 21 along the path of movement of the piston member 29 as it descends with the plunger 22 to carry the valve disc or washer 28 toward and finally onto its seat 15 to close the valve-port 14. Said check-ports 47 are thus disposed in a relatively step-by-step relation, whereby the same may successively be closed by the descending movement of said piston member 29. The outer open side of the chambered portion 45 is closed by a cover-plate 48 and sealed by an intermediate gasket 49. Said cover-plate is secured in place by cap screws 50, or by any other suitable form of fastening means.

Means are provided for opening the valve by manual operation. This means comprises a spindle 51 journaled to extend transversely through the outlet extension 12, one end of said spindle extending through a stuffing-box (not shown) as is customary with valves of this type, and the exterior portion of said spindle terminating in a squared end 52 by means of which an actuating wrench may be applied to the spindle for manually turning the same. Fixed on said spindle 51, so as to turn therewith, is a lift-cam 53. Said lift-cam, when rotated in a proper direction, is adapted to operatively engage an anti-friction roller 54 which is journaled in connection with and so as to be carried by the lower free end portion of the axial extension 26 of the plunger 22, whereby an upward thrust is imparted to the latter, causing the same to rise in the cylinder chamber 21 against the compression of the spring 32, and thereby raise the valve disc or washer 28 from the valve seat 15, and thus to open the valve port 14 for flow of fluid therethrough from the intake extension 11 for discharge through said outlet extension 12, so long as such condition is maintained by the manually applied operating force.

To open the valve, the lift-cam 53 is rotated in anti-clockwise direction as viewed in Fig. 1 by application of a suitable wrench to the squared end 52 of its spindle 51. When the lift-cam engages the anti-friction roller 54 of the plunger extension 26, the same exerts an upward thrust whereby the plunger 22 is raised against the compression of the spring 32, thereby moving the valve disc or washer 28 off of its seat 15 so as to open the valve port 14 to the flow of fluid from the intake extension 11 to and outwardly from the outlet extension 12, while at the same time the piston member 29 rises in the cylinder chamber 21 so as to carry the skirt 31 of the piston washer 30 upwardly past the ports 47 thereby opening the same for communication between the by-pass passage 36 and the interior of the valve body or casing 10, and consequently assuring a rapid expulsion of fluid from the cylinder chamber 21 above the piston member 29. When the valve is thus manually opened it must be held open manually, for when manual actuating force is released, the valve is self-closing under the reaction of the spring 32.

Under the closing thrust of the spring 32 whereby the plunger 22 and its piston member 29 starts downward, the fluid finds comparatively free entree through the open ports 47 into the by-pass passage 36 and thence into the cylinder chamber 21 above the piston member 29. As a consequence of such free entree of the fluid behind the piston member 29, the plunger 22 and valve washer 28 starts rapidly downward toward closing position. As the skirt 31 of the piston washer 30 approaches and passes the ports 47, the same are successively closed to the flow of fluid therethrough and thence through the by-pass passage 36 into the cylinder chamber 21 behind the piston member and is progressively reduced so that fluid pressure on opposite sides of the piston member is unbalanced, and pressure resistance to downward movement of the piston member is progressively increased as the valve washer 28 approaches its seat 15. This action results in a step by step retardation of valve closing movement, so that the valve washer will slowly approach and finally settle upon its seat in valve port closing position without causing undue back pressure or liquid hammer in the pipe-line which serves the valve. Owing to the provision of the port 39 and its adjusting needle valve 42, as located below the lower limit of piston member movement, a slow leak, adjustable to proper capacity, is provided for the flow of fluid into the by-pass passage and thence into the cylinder chamber 21, whereby the final settling of the valve washer 28 upon its seat 15 and in closed relation to the valve port 14 is so controlled that no shock or hammer is possible at the moment of final closing.

From the structural standpoint, the arrangement of the by-pass passage 36 as combined with the chambered portion 45, the chamber 46 of which may be opened by removing the cover-plate 48, is of great advantage and convenience, especially for the reason that, when open, said chamber 46 gives ready access to the cylinder chamber wall 34 so that the ports 47 may be easily drilled therethrough, and disposed and sized for most efficient performance according to the character of fluid the valve is to be used to control.

We are aware that many changes could be made in the constructions above set forth, and many apparently widely different embodiments of this invention could be made without departing from the scope thereof. It is therefore intended that all matter contained in the above description or shown in the accompanying drawing shall be interpreted as illustrative and not in a limiting sense.

We claim:

1. A self-closing valve of the slow-closing type comprising, a casing body having intake and outlet extensions and a valve port therebetween, a cylinder chamber provided in connection with said casing body in axial alignment with and above said valve port, a plunger carrying a valve means adapted to close said valve port and a piston means movable in said cylinder chamber, spring means to yieldably thrust said plunger in direction to close said valve port by the valve means carried thereby, means to provide a by-pass passage contiguous to a wall of said cylinder chamber, said by-pass passage communicating with said cylinder chamber above the piston means carried by said plunger, said cylinder chamber wall contiguous to said by-pass passage having diagonally disposed means of communication between the cylinder chamber and by-pass passage, said means of communication lying somewhat above the downward limit of movement of said piston means so as to be traversed by the latter, and means to manually raise said plunger and its valve means to valve port opening position.

2. A self-closing valve of the slow-closing type comprising, a casing body having intake and outlet extensions and a valve port therebetween, a cylinder chamber provided in connection with said casing body in axial alignment with and above said valve port, a plunger carrying a valve means adapted to close said valve port and a piston means movable in said cylinder chamber, spring means to yieldably thrust said plunger in direction to close said valve port by the valve means carried thereby, means to provide a by-pass passage contiguous to a wall of said cylinder chamber, said by-pass passage communicating with said cylinder chamber above the piston means carried by said plunger, said cylinder chamber wall contiguous to said by-pass passage having diagonally disposed means of communication between the cylinder chamber and by-pass passage, said means of communication lying somewhat above the downward limit of movement of said piston means so as to be traversed by the latter, means to provide a regulatable slow-leak communication between said by-pass passage and the casing body interior below the downward limit of movement of said piston means, and means to manually raise said plunger and its valve means to valve port opening position.

3. A self-closing valve of the slow-closing type comprising, a casing body having intake and outlet extensions and a valve port therebetween, a cylinder chamber provided in connection with said casing body in axial alignment with and above said valve port, a plunger carrying a valve means adapted to close said valve port and a piston means having cup-shaped washer movable in said cylinder chamber, spring means to yieldably thrust said plunger in direction to close said valve port by the valve means carried thereby, a by-pass member formed in connection with said casing body to provide a by-pass passage in communication with said cylinder chamber above the piston means carried by said plunger, said casing body having a chambered portion provided with an outwardly open chambered interior contiguous to a wall of said cylinder chamber and intersecting said by-pass passage, said latter wall having a diagonally descending row of relief ports communicating between the cylinder chamber and the interior of said chambered portion, the lowermost of said row of relief ports lying somewhat above the downward limit of movement of said piston means so as to be traversed by the cup shaped washer of the latter, means to close the open outer end of said chambered portion, and means to manually raise said plunger and its valve means to valve port opening position.

4. A self-closing valve of the slow-closing type comprising, a casing body having intake and outlet extensions and a valve port therebetween, a cylinder chamber provided in connection with said casing body in axial alignment with and above said valve port, a plunger carrying a valve means adapted to close said valve port and a piston means having a cup-shaped washer movable in said cylinder chamber, spring means to yieldably thrust said plunger in direction to close said valve port by the valve means carried thereby, a by-pass member formed in connection with said casing body to provide a by-pass passage in communication with said cylinder chamber above the piston means carried by said plunger, said casing body having a chambered portion provided with an outwardly open chambered interior contiguous to a wall of said cylinder chamber and intersecting said by-pass passage, said latter wall having a diagonally descending row of relief ports communicating between the cylinder chamber and the interior of said chambered portion, the lowermost of said row of relief ports lying somewhat above the downward limit of movement of said piston means so as to be traversed by the cup-shaped washer of the latter, means to close the open outer end of said chambered portion, means to provide a regulatable slow-leak communication between said by-pass passage and the casing body interior below the downward limit of movement of said piston means, and means to manually raise said plunger and its valve means to valve port opening position.

HOWARD C. KRONE.
WILLIAM MEYER.